US011123771B2

(12) United States Patent
Kalm et al.

(10) Patent No.: US 11,123,771 B2
(45) Date of Patent: Sep. 21, 2021

(54) AUTOMATED MODULAR SYSTEM FOR SORTING ITEMS

(71) Applicant: Amazon Technologies, Inc., Seattle, WA (US)

(72) Inventors: William Scott Kalm, Seattle, WA (US); Joshua David Landry, Auburn, WA (US); Brian Stuart Hoffman, Seattle, WA (US); Peter A. Grant, Seattle, WA (US); Dinesh Mahadevan, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 16/398,006

(22) Filed: Apr. 29, 2019

(65) Prior Publication Data
US 2020/0338597 A1    Oct. 29, 2020

(51) Int. Cl.
| | | |
|---|---|---|
| *B65G 21/18* | (2006.01) | |
| *B07C 3/08* | (2006.01) | |
| *B65G 47/14* | (2006.01) | |
| *B65G 1/04* | (2006.01) | |
| *B65G 1/06* | (2006.01) | |
| *B65G 33/02* | (2006.01) | |
| *G06Q 10/08* | (2012.01) | |
| *B65G 65/42* | (2006.01) | |

(52) U.S. Cl.
CPC ............ *B07C 3/082* (2013.01); *B65G 1/0414* (2013.01); *B65G 1/065* (2013.01); *B65G 21/18* (2013.01); *B65G 33/02* (2013.01); *B65G 47/1492* (2013.01); *B65G 65/42* (2013.01); *G06Q 10/087* (2013.01); *B65G 2207/30* (2013.01)

(58) Field of Classification Search
CPC .. B07C 3/082; B65G 47/1492; B65G 1/0414; B65G 1/065; B65G 33/02; B65G 1/0435; B65G 1/0407; B65G 17/126; G65G 65/42
See application file for complete search history.

(56) References Cited

U.S. PATENT DOCUMENTS

| | | | | |
|---|---|---|---|---|
| 7,861,844 B2 * | 1/2011 | Hayduchok | ............... | B07C 7/02 198/370.1 |
| 9,020,632 B2 * | 4/2015 | Naylor | ................. | B65G 1/0492 700/218 |
| 9,334,116 B2 * | 5/2016 | DeWitt | ............... | B65G 1/0492 |
| 10,358,288 B2 * | 7/2019 | Hansl | ................... | B65G 1/1373 |
| 10,457,483 B2 * | 10/2019 | DeWitt | ............... | B65G 1/0492 |

(Continued)

FOREIGN PATENT DOCUMENTS

| | | |
|---|---|---|
| CN | 107406194 A | 11/2017 |
| DE | 102008029440 A1 | 12/2009 |

(Continued)

OTHER PUBLICATIONS

Great Britain Patent Application No. 2006006.7; Combined Search and Examination Report; dated Jan. 8, 2021; 11 pages.

*Primary Examiner* — Patrick H Mackey
(74) *Attorney, Agent, or Firm* — BakerHostetler

(57) ABSTRACT

A sortation system uses short conveyors or transporter units on a lift to move products or packages to totes in a storage rack. The lift may be a carousel. Automated components remove the totes from the rack and place them on outfeed conveyors. The system to remove the totes can include a transfer vehicle. The sortation system may be modular.

16 Claims, 8 Drawing Sheets

(56) References Cited

U.S. PATENT DOCUMENTS

| | | | |
|---|---|---|---|
| 2013/0209203 A1* | 8/2013 | Rafols | B66F 9/0755 |
| | | | 414/279 |
| 2018/0029796 A1 | 2/2018 | De Vries | |
| 2018/0290830 A1* | 10/2018 | Valinsky | B65G 1/0421 |
| 2020/0231419 A1* | 7/2020 | Kalm | B65G 1/0407 |

FOREIGN PATENT DOCUMENTS

| | | |
|---|---|---|
| EP | 2295155 A1 | 3/2011 |
| JP | 2013-230918 A | 11/2013 |

* cited by examiner

AUTOMATED MODULAR SYSTEM FOR SORTING ITEMS

BACKGROUND

The present disclosure relates to automation; and more particularly to an automated system for handling and sorting items.

A vast number of different items entering a modern warehouse or distribution center must be sorted, such as (for merely one example) by placing items into a container that has identifying information. In a modern fulfillment center, the item may be a commercial product that enters the fulfillment center in a package, where it is placed together in a tote and eventually in an external shipping package, such as a corrugated paperboard box, a mailer, or the like. In a sort center, the item may be the external package that is placed into a gaylord or the like. There are many other examples of sorting items.

DETAILED DESCRIPTION

Figure 1:
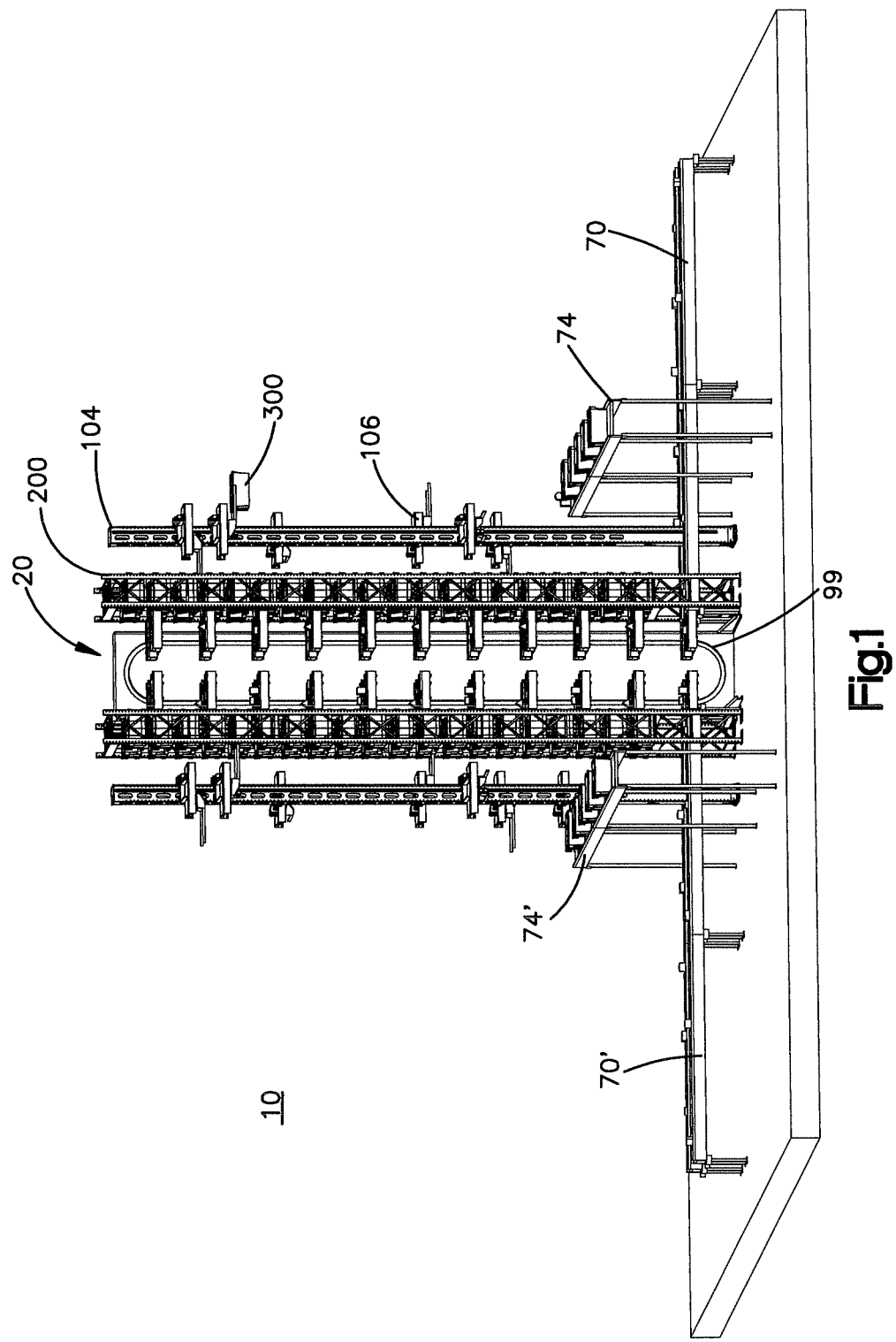
FIG. 1 is a perspective view of an example of a modular automated system for sortation and storage of items.

An automated system for sorting, storing, and retrieving items in large-scale environment is illustrated in FIG. 1. Items 99 in the embodiment of the figures represent a vast number of different or unique items that are handled in modern commerce, such as an item fulfillment center. A non-limiting example of items 99 may be products that are provided by a manufacturer in its own packaging, products that have been placed into exterior packages such as a corrugated paperboard box, a padded mailer or envelope, of the like. Item 99 includes identifying information, such as a bar code, two dimensional code, or the like.

Figure 2:
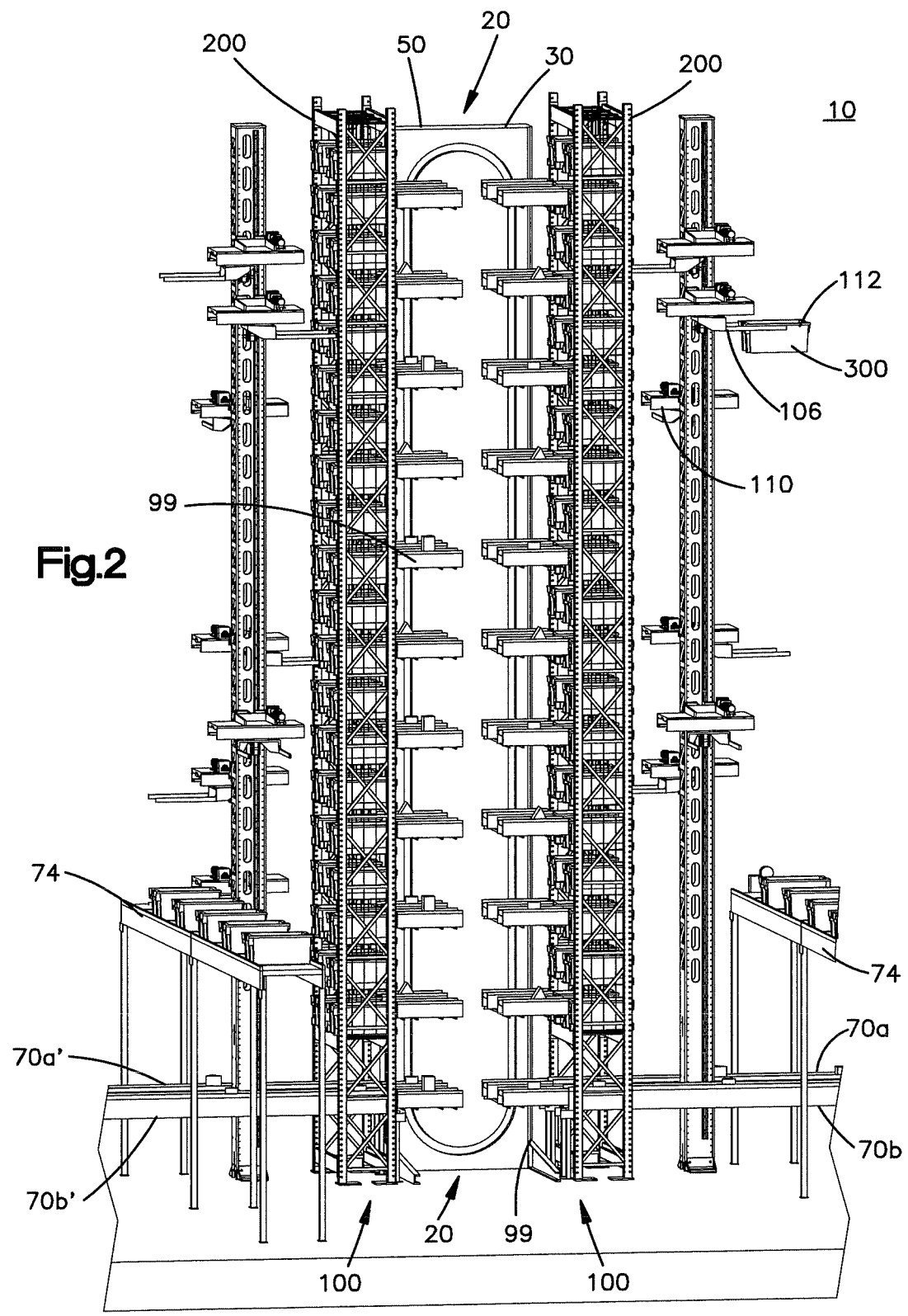
FIG. 2 is a perspective, front view of the system of FIG. 1.
Figure 3:
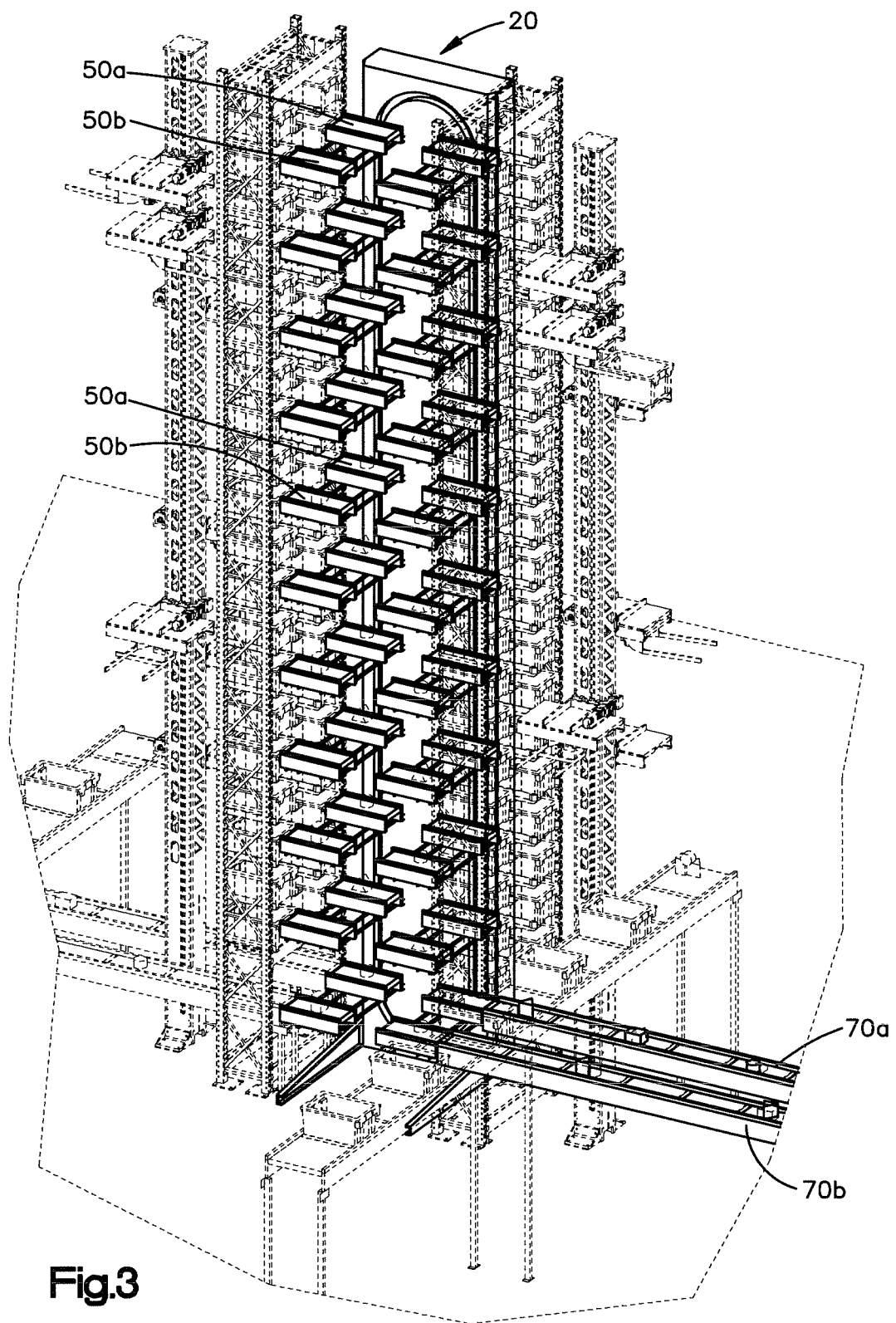
FIG. 3 is a perspective view of the sortation system of FIG. 1, with portions of the storage system removed for clarity.
Figure 4:
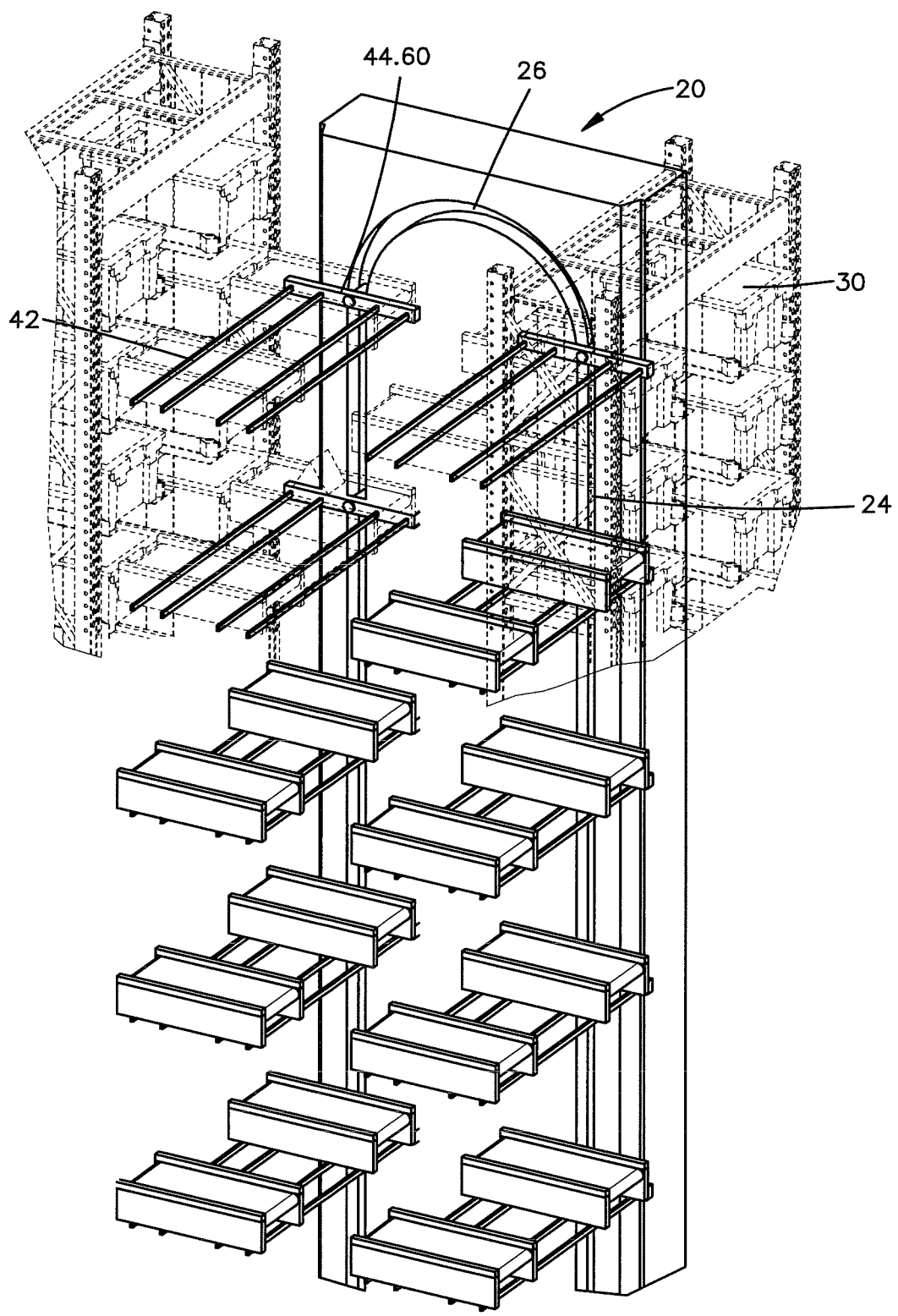
FIG. 4 is perspective view of portions of a sortation system of FIG. 3.
Figure 5:
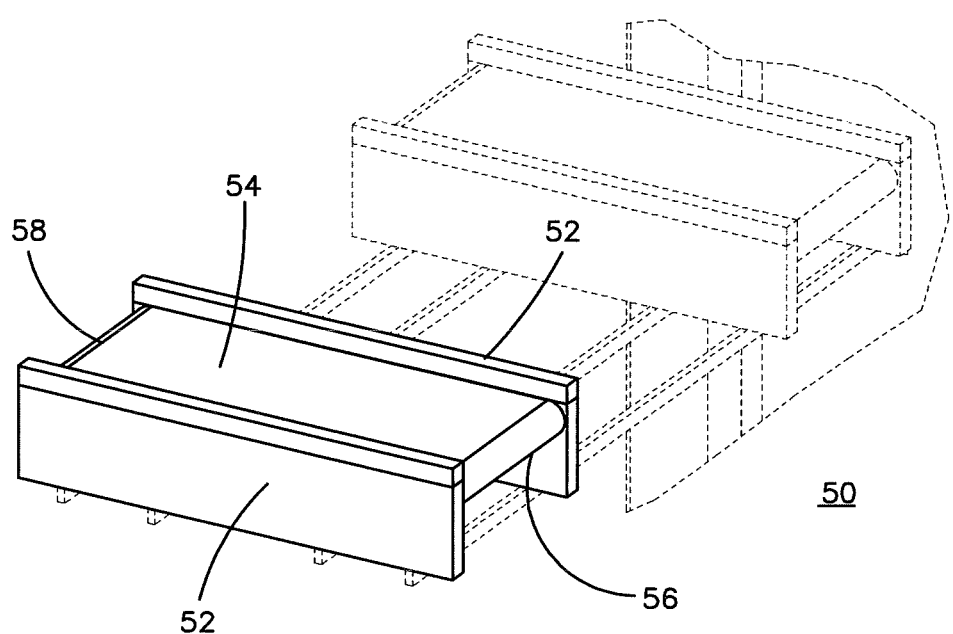
FIG. 5 is an enlarged perspective view of a transporter unit or conveyor of the sortation system of FIG. 3.
Figure 6:
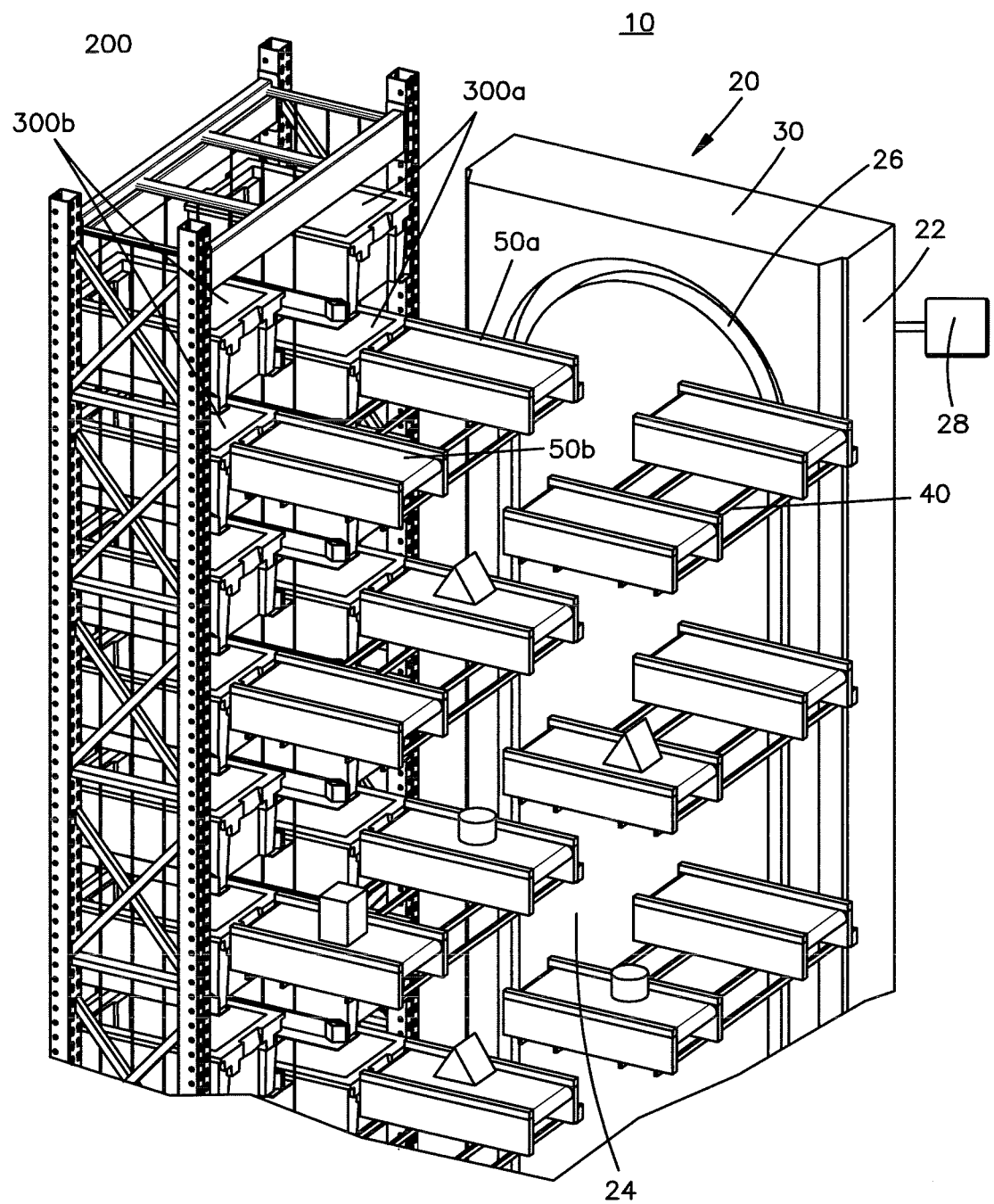
FIG. 6 is an enlarged perspective view of portions of the automated system for sortation and storage of items of FIG. 1.

Referring to the right sides of FIGS. 1 and 2, a modular automated system for sortation and storage of items 99 includes a lift system 10, an inventory conveyance system 100, an inventory storage system 200, an infeed conveyor 70, and an outfeed conveyor 74. Infeed conveyor 70 may be of any type, such as a conventional belt conveyor, roller conveyor, and the like. Other configurations, such as a tipping chute, powered rollers, and/or a pusher to eject the item, may be employed. The term "conveyor" is used herein to encompass any type of device for ejecting an item, including but limited to the examples provided herein. Infeed conveyor carries singulated (that is, spaced apart, one-at-a-time) items 99.

Lift system 10 includes a vertical lift unit 20 and transporter units 50. Lift unit 20 (in the embodiment of the figures) includes a track 22 formed into a continuous, closed loop. Track 22 includes parallel vertical portions 24, upper ends of which are joined by a semi-circular or curved portion 26. Lower ends of vertical portions 24 are joined by another semi-circular or curved portion 26.

Lift unit 20 can be actuated by any type of drive, such as a continuous chain drive about end sprockets (not shown in the figures) to form a portion of track 22. The chain carries spaced-apart trollies 44 that remain fixed relative to horizontal when moving along track 22.

A carrier 40 is affixed to each one of the trollies 44. Carrier 40 as illustrated include forks 42 that extend from trolley 44 and form a platform for holding a transporter unit 50. Accordingly, the drive (not shown in the figures) of lift unit 20 moves carriers 40 along track 22, including lifting transporter unit 50 vertically, as desired. Each trolley 44 moves such that the platform or forks 42 remain horizontal throughout movement about the carousel track 22, including through curved track portions 26. Accordingly, transporter units 50 remain horizontally oriented.

Lift unit 20 employ any structures and actuators that achieve the lifting function of the transport units 50, such as a chain and sprocket drive, belts and pulleys, rack and pinions, and the like. Other configurations, structures, and functions are contemplated. For merely one example, lift 20 may (optionally) be a Prorunner® MK5 Conveyor as commercially available from Qimarox B.V.

Each transporter unit 50 (in the example in the figures) includes a pair of opposing, peripheral sidewalls 52 and a belt 54 that extends between an inlet end 56 and an outlet end 58. As explained more fully below, the inlet end and outlet end may be reversed when used in some ways.

The transporter units 50 may be powered via a wiring harness that extends through the trolley 44 and is connected to a power supply through a slip ring or other electrical contacts (not shown in the figures) between stationary and moving parts. A wide variety of known technology is suitable for the purpose of providing electrical power to transporter units 50, as will be understood by persons familiar with electrical power supply. Alternatively, a wiring harness dress pack (not shown in the figures) may connect motors of the transporter units 50 to a power supply. A wiring harness and/or dresspack may be used for control wiring for carrying control signals between a controller and the transporter units. Communication for control signals may also be wireless, as will be understood by persons familiar with control signal communication technology. Other means for providing electric power to the transporter units, such as without limitation batteries for powering the motor, which batteries may be recharged via induction or other means are contemplated. Designing transporter units 50 to be lightweight with low power requirements, and/or operating on low voltage (for example 24 volts), may be an advantage in some circumstances.

Referring again to FIGS. 1 and 2, a second infeed conveyor 70' is located on the opposing side of lift system 10. Accordingly, lift unit 20 can operate to position a transporter unit 50 to receive an item 99 from first infeed conveyor 70 and either simultaneously or sequentially position another one of the transporter units 50 to receive another item from second infeed conveyor 70'.

Moreover, as illustrated in the figures, each carrier can include two transporter units 50a and 50b. The present invention is not limited to any number of transporter units on the carrier, as the upper limit on the number of transporter units is merely a matter of design choice. When referring to first and second components or systems, the reference number is appended with letter 'a' or 'b', such as reference numbers 50*a* and 50*b* to refer individually to the transporter units on the same carrier 40. The reference number without an appended letter is used to refer generally to the component or system, such as reference number 50 to refer to any one of the transporter units.

To feed transporter units 50*a* and 50*b*, a pair of first infeed conveyors 70*a* and 70*b* and a pair of second infeed conveyors 70*a*' and 70*b*' may be employed.

To illustrate the function of the lift system 10, items 99 and transported by infeed conveyors 70*a*, preferably spaced apart. Upon engaging lift system 10, a control system (not shown) has identifying information associated with each item 99 and may verify the information by a scanner (not shown) as needed and may determine the presence and position of an item 99 by a sensor, such as but not limited to a photoelectric sensor, proximity sensor, or the like.

The controller actuates lift unit 20 to move a transporter unit 50*a* into position at a distal end of conveyor 70*a* such that item 99 is discharged from conveyor 70*a* onto belt 54 of transporter unit 50*a*. Lift unit 20 may pause while transporter unit 50*a* is in position at the discharge end of conveyor 70*a* such that lift unit indexes between positions, or the vertical speed of the carrier 40 may be chosen such that the carrier 40 is continuously moving and is timed to move past the discharge point of conveyor 70*a* to receive item 99. The term "eject" is used to refer to discharge of item 99 regardless whether the conveyor is stationary or moving.

The movement of lift unit 20 may be sequenced as desired also to position a specific one of the transporter units 50 at a second location or position to discharge or eject the item 99 from the transporter unit to a desired tote 300, as explained more fully below. In this regard, a transporter unit 50 may in some circumstances include more than one item 99. For example, two items 99 may travel together on infeed belt 70*a* according to instructions from the control system. Or the transporter unit 50 already having one item 99 may be placed in position for receiving a second item 99 from conveyor 70*a* according to instructions from the control system. Upon lift unit 20 positioning transporter unit 50 at a desired second location corresponding to a desired tote 300, belt conveyor 54 activates to eject item 99 into the appropriate tote 300.

As illustrated in the figures, a pair of first and second transporter units 50*a* and 50*b* may receive items from conveyors 70*a* and 70*b*. And the transporter units 50*a* and 50*b* may about track 22 to be in position to receive items 99 from second infeed conveyors 70*a*' and 70*b*'.

Figure 7:
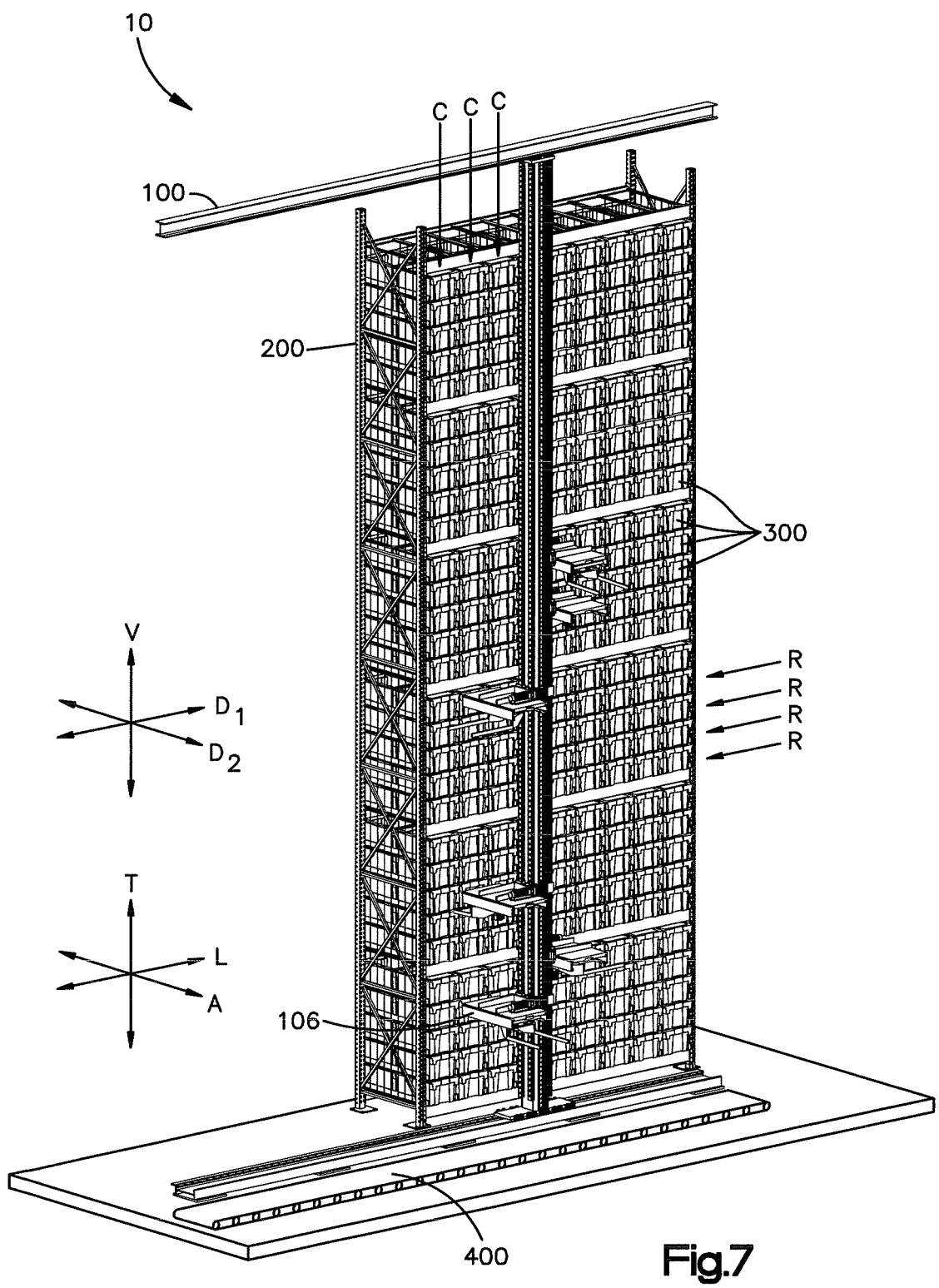
FIG. 7 is a perspective view of portions of automated storage system of FIG. 1.

Referring to FIG. 7, an inventory processing system is configured to store items 99 in totes 300 after the items are discharged from transporter units 50, and retrieve the totes 300 containing items 99. The inventory processing system illustrated in FIG. 7 has an inventory storage structure 200 that is configured to support totes 300 thereon. Each tote 300 can be any suitable storage container configured to carry one or more inventory items therein, regardless of the size, structure, open or closed top, and other variables. Preferably, the inventory storage containers 300 are open-top plastic totes configured to carry items in an e-commerce supply chain and of a size that an individual person or robot can lift.

The inventory storage structure 200 can be configured to support the inventory storage containers 300 in a vertically-oriented array of storage containers 300. Thus, the storage structure or rack 200 can support the storage containers 300 such that the inventory storage containers 300 are arranged in a plurality of rows R and columns C. In the embodiment of FIG. 7, eight columns of totes 300 are shown to illustrate the modularity of the lift system 10. For example, lift unit 20 may have four transporter units 50 per carrier 40, and two lift units 20 may be positioned on opposing sides of rack 200 facing each other such that each of the eight columns C correspond to the positions of the transporter units.

The inventory storage structure 200 is illustrated as configured as a shelving system. Alternatively, the inventory storage structure 200 can be configured as any other system that supports storage containers 300 in rows and columns, such as a movable storage system in which the storage containers 300 can be rotated. For example, the movable storage system can be implemented in a manner similar to that disclosed in U.S. patent application Ser. No. 16/037,424, the teachings of which are hereby incorporated by reference as if set forth in their entirety herein.

The inventory processing system also has an inventory conveyance system 100 disposed adjacent to the inventory storage structure 200 with respect to a second horizontal direction $D_2$ that is substantially perpendicular to both the first horizontal direction $D_1$ and the vertical direction V. The inventory conveyance system 100 is configured to stow the inventory storage containers 300 onto the inventory storage structure 200 and/or retrieve the inventory storage containers 300 from the inventory storage structure 200. In one example, the inventory processing system can include at least one separate storage destination 400 that is separate and distinct from the inventory storage structure 200. In some examples, the at least one separate storage destination 400 can be a material conveyance device, such as a belt conveyor or roller conveyor, disposed adjacent to the inventory conveyance system 100. For example, the inventory conveyance system 100 can be disposed between the at least one separate storage destination 400 and the inventory storage structure 200. The inventory conveyance system 100 can be configured to transfer storage containers 300 between the separate storage destination 400 and the inventory storage structure 200. For example, the separate storage destination 400 can receive storage containers 300 from upstream processing (such as sorting), and the inventory conveyance system 100 can be configured to move the storage containers 300 from the separate storage destination 400 to the inventory storage structure 200 so as to stow the storage containers 300 on the inventory storage structure 200. Additionally or alternatively, the inventory conveyance system 100 can be configured to retrieve storage containers 300 from inventory storage structure 200, and move the storage containers 300 to the separate storage destination 400, which can in turn deliver the storage containers 300 to downstream processing (such as packaging).

Figure 8:
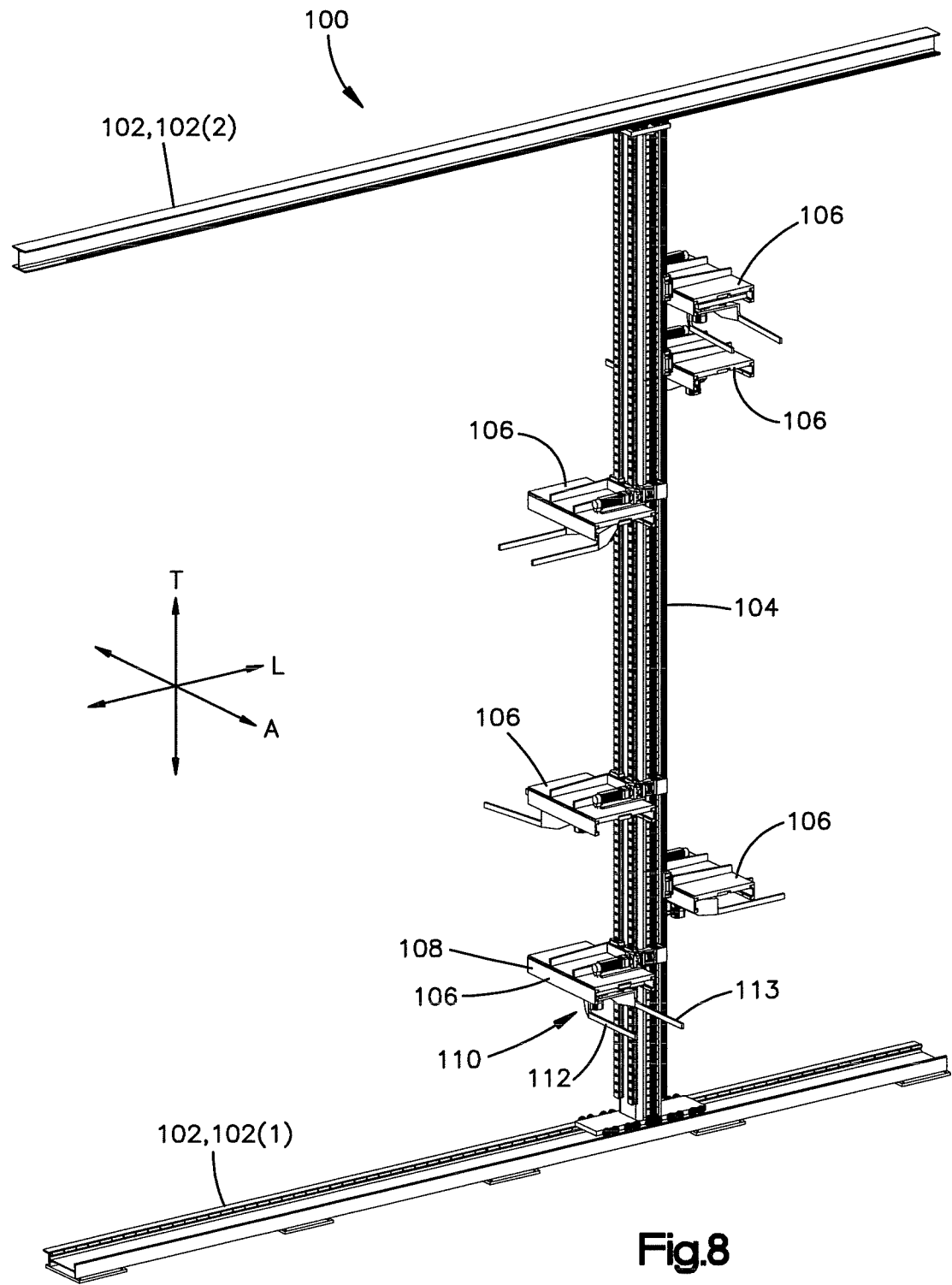
FIG. 8 is a view of a portion of the system of FIG. 7, with portions removed for clarity.

Referring to FIG. 8, the inventory conveyance system 100 is shown according to one embodiment without the inventory support structure 200. In general, the inventory conveyance system 100 comprises at least one longitudinal track 102 that is elongate along a longitudinal direction L. The inventory conveyance system 100 comprises at least one transverse track 104 that extends from the at least one longitudinal track 102 along a transverse direction T that is angularly offset from the longitudinal direction L. In one example, the transverse direction T can be substantially perpendicular to the longitudinal direction L, such as within ±15 degrees of being perpendicular to the longitudinal direction L. The transverse track 104 is configured to ride along the at least one longitudinal track 102 along the longitudinal direction L.

The inventory conveyance system 100 comprises at least one inventory transfer vehicle 106 that is configured to ride along the at least one transverse track 104 along the transverse direction T. The at least one inventory transfer vehicle 106 comprises a vehicle body 108 and at least one end effector 110 carried by the vehicle body 108. The at least one end effector 110 has a pair of prongs 112 that are offset from one another so as to define a fork 113 that is configured to receive a storage container 300 between the pair of prongs 112. The end effector 110 can be configured to move the pair of prongs 112 inward and outward along a lateral direction A, that is substantially perpendicular to the longitudinal direction L and transverse direction T. The end effector 110, such as the pair of prongs 112 of the end effector 110, can be configured to rotate relative to the vehicle body 108 about an axis that extends along the transverse direction T. The at least one inventory transfer vehicle 106 is configured to removably couple to a storage container 300 and carry the storage container 300 so as to stow the storage container 300 onto the storage structure 200 or remove the storage container 300 from the inventory storage structure 200. In alternative embodiments, the inventory conveyance system 100 can include end effectors other than forks, including any other suitable end effector configured to grab an object from a storage structure 200.

The inventory conveyance system 100 can comprise as few as one inventory transfer vehicle 106, or a plurality of inventory transfer vehicles 106 that are configured to ride along the transverse track 104. Each inventory transfer vehicle 106 can carry an end effector 110. Additionally, the inventory conveyance system 100 can include as few as one transverse track 104, or a plurality of transverse tracks 104 that are offset from one another along the longitudinal direction L. Each transverse track 104 can support at least one inventory transfer vehicle 106 that rides along the transverse track 104 along the transverse direction and that carries an end effector 110. The plurality of transverse tracks 104 can work concurrently to stow and/or retrieve storage containers 300, thereby increasing the rate at which the storage containers 300 can be stowed and/or retrieved. In some examples, the plurality of transverse tracks 104 can be configured to service (i.e., stow and/or remove storage containers 300) shared sections of the inventory storage structure 200. In other examples, the inventory storage structure 200 can be divided into storage sections that are offset from one another along the first horizontal direction $D_1$, and each transverse track 104 can be configured to service a different one of the storage sections.

The at least one longitudinal track 102 can include a first longitudinal track 102(1) that is elongate along the longitudinal direction L. In some examples, the at least one longitudinal track 102 can include a second longitudinal track 102(2) that is elongate along the longitudinal direction L. The first and second longitudinal tracks 102(1) and 102(2) can be spaced from one another along the transverse direction T. In some examples, the first and second longitudinal tracks 102(1) and 102(2) can be substantially parallel to one another, such as within +15 degrees of being parallel to one another. In such embodiments, the transverse track 104 can extend from the first longitudinal track 102(1) to the second longitudinal track 102(2). For example, the transverse track 104 can terminate at the first longitudinal track 102(1) and at the second longitudinal track 102(2).

In some embodiments, the longitudinal direction L can be aligned with the first horizontal direction $D_1$ and the transverse direction T can be aligned with the vertical direction V as shown in FIG. 1 such that the transverse track 104 is elongate along the vertical direction V. In alternative embodiments, the longitudinal direction L can be aligned with the vertical direction V, and the transverse direction T can be aligned with the first horizontal direction $D_1$ such that the transverse track 104 is elongate along the first horizontal direction $D_1$. Additional details of the inventory storage system are provided by co-pending U.S. patent application Ser. No. 16/253,868, titled "Inventory Conveyance System That Transfers Storage Containers To And From A Vertically Arranged Array of Storage Containers."

A method of operating the inventory processing system includes transferring a tote 300 a particular storage position 202 of the inventory storage structure 200 to outfeed conveyors 74 and 74'. The method comprises causing an inventory transfer vehicle 106 to move along a longitudinal direction L and a transverse direction T, angularly offset from the longitudinal direction L, until the inventory transfer vehicle 106 is aligned with a select storage position 202 of rack 200. This step can comprise causing the inventory transfer vehicle 106 to ride along a transverse track 104 along the transverse direction T until the inventory transfer vehicle 106 is transversely aligned with the select storage position 202. This step can additionally or alternatively comprise causing the transverse track 104 to ride along at least one longitudinal track 102 along a longitudinal direction L until the inventory transfer vehicle 106 is longitudinally aligned with the select storage position 202. The inventory transfer vehicle 106 can be moved along the transverse track 104 before the transverse track 104 is moved along the at least one longitudinal track 102, after the transverse track 104 is moved along the at least one longitudinal track 102, or while the transverse track 104 is moved along the at least one longitudinal track 102.

The method can comprise a step of causing an end effector 110 supported by the inventory transfer vehicle 106 to move relative to the vehicle body 108 so as to couple to a tote 300 at the select storage position 202 or decouple from the tote 300 at the select storage position 202. This step can comprise causing the end effector 110 to rotate relative to the vehicle body 108 about an axis that extends along the transverse direction T until the end effector 110 faces the inventory storage structure 200. In some examples, causing the end effector 110 to rotate can comprise causing a motor 176 to rotate the end effector 110.

This step can additionally or alternatively comprise causing the end effector 110 to move along a lateral direction A, substantially perpendicular to the longitudinal direction L. The step of causing the end effector 110 to move can comprise causing the end effector 110 to ride along at least one lateral track 162 of the inventory transfer vehicle 106. In some examples, causing the end effector 110 to move can comprise actuating an actuator 170, such as a linear induction motor, so to cause the end effector 110 to ride along the at least one lateral track 162. In some examples, causing the end effector 110 to move can comprise causing wheels of the end effector 110 to ride along the at least one lateral track 162. In some examples, the step of causing the end effector 110 to move can comprise causing prongs 112 of a fork 113 of the end effector 110 to move along sidewalls 302 and 304 of a storage container 300 at the select storage position 202 so as to couple the end effector 110 to the storage container 300 or decouple the end effector 110 from the storage container 300.

Upon tote 300 being moved from rack 200, the tote containing one or more items 99 can be positioned onto outfeed conveyors 174 and 174'. In this regard, roller or like structure of conveyors 174 and 174' may be spaced apart to enable forks 113 of end effector 110 to pass through so as to deposit tote 300 onto conveyor 174 or 174'. Other discharge mechanisms are contemplated, as will be straightforward and understood by persons familiar with conveyor technology.

A control system for implementing the lift system 10 may receive data from one or more sensors (for example, optical, contact, proximity, etc.) disposed on and/or around the infeed conveyors 70, transporter units 50, and/or outfeed conveyors 74. Date on motor position, torque and the like for the motors of any of the components may be received by the control system.

The illustrations and descriptions of the examples and embodiments shown in the figures are for exemplary purposes only, and should not be construed limiting the disclosure. One skilled in the art will appreciate that the present disclosure contemplates various embodiments. Additionally, it should be understood that the concepts described above with the above-described examples and embodiments may be employed alone or in combination with any of the other examples and embodiments described above. It should further be appreciated that the various alternative examples and embodiments described above with respect to one illustrated embodiment can apply to all examples and embodiments as described herein, unless otherwise indicated.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A sortation and inventory storage system, comprising:
    a sortation system comprising:
        a plurality of transporter units, the transporter units being adapted for receiving items at a first position, and each transporter unit including a conveyor; and
        a lift adapted for moving the transporter units vertically from the first position to second positions, wherein the conveyors of the transporter units are adapted to eject the items from the conveyors at the second positions;
    an infeed conveyor adapted for loading the items onto the transporter units;
    at least one inventory storage structure that supports a plurality of storage positions arranged in at least one vertical column, each one of the storage positions having a tote; and
    an inventory conveyance system comprising:
        at least one vertical track that corresponds to the at least one vertical column; and
        an inventory transfer vehicle coupled to the at least one vertical track, the inventory transfer vehicle comprising a vehicle body and an end effector supported by the vehicle body, the end effector having a pair of prongs that are offset from one another so as to define a fork that is configured to receive a tote between the pair of prongs,
    wherein the sortation and inventory storage system is configured such that the items move from the infeed conveyor sequentially onto the transporter units, the lift moves the transporter units to desired second positions where the conveyor ejects the item into the tote, and the inventory transfer vehicle receives the tote having the item and delivers the tote to an outfeed conveyor.

2. The sortation and inventory storage system of claim 1, wherein the lift is a carousel having a continuous loop track, the carousel including carriers adapted for carrying the transporter units.

3. The sortation and inventory storage system of claim 2, wherein the carriers are adapted to move via the continuous loop track on trolleys, and wherein the carriers and the transporter units are horizontal throughout moving through the continuous loop track.

4. The sortation and inventory storage system of claim 2, wherein the system has two or more transporter units on each carrier, and two or more infeed conveyors adapted for loading items onto the transporter units.

5. The sortation and inventory storage system of claim 1, wherein the at least one inventory storage structure includes first and second inventory storage structures, the first inventory storage structure located on a first side of the lift, and the second inventory storage structure located on a second side of the lift.

6. The sortation and inventory storage system of claim 1, wherein the conveyor is a belt conveyor.

7. The system of claim 1, wherein the system is configured to be modular.

8. The system of claim 1, wherein the at least one inventory storage structure comprises a plurality of shelves.

9. A system for sorting items, the system comprising:
    two or more infeed conveyors adapted for loading items onto two or more transporter units;
    the two or more transporter units adapted for receiving the items from the two or more infeed conveyors at a first position, each transporter unit including a conveyor; and
    a lift comprising carriers, the two or more transporter units being mounted to one of the carriers, the lift adapted for moving the two or more transporter units vertically from the first position to second positions,
    wherein the conveyors of the two or more transporter units are adapted to eject the items from the conveyors at the second positions.

10. The system of claim 9, wherein the lift is a carousel having a continuous loop track.

11. The system of claim 10, wherein the carriers and the two or more transporter units are horizontal throughout moving through the continuous loop track.

12. The system of claim 9, wherein the conveyor is a belt conveyor.

13. The system of claim 9, further comprising a plurality of totes, and a storage structure for holding the plurality of totes.

14. The system of claim 13, wherein the storage structure comprises a plurality of shelves.

15. A method of sorting items, the method comprising:
sequentially loading items onto conveyors of transporter units at a first location;
lifting the transporter units to second locations;
engaging each one of the conveyors to eject the items into totes at a corresponding second location;
moving the totes onto transfer vehicles;
moving the transfer vehicles to at least one outfeed conveyor; and
loading the totes onto the at least one outfeed conveyor.

16. The method of claim 15, wherein lifting the transporter units to the second locations includes moving the transporter units in a continuous loop of a carousel.

* * * * *